Sept. 23, 1924.  1,509,213
R. A. MOORE
DRAG IMPLEMENT
Filed Jan. 26, 1924   2 Sheets-Sheet 1
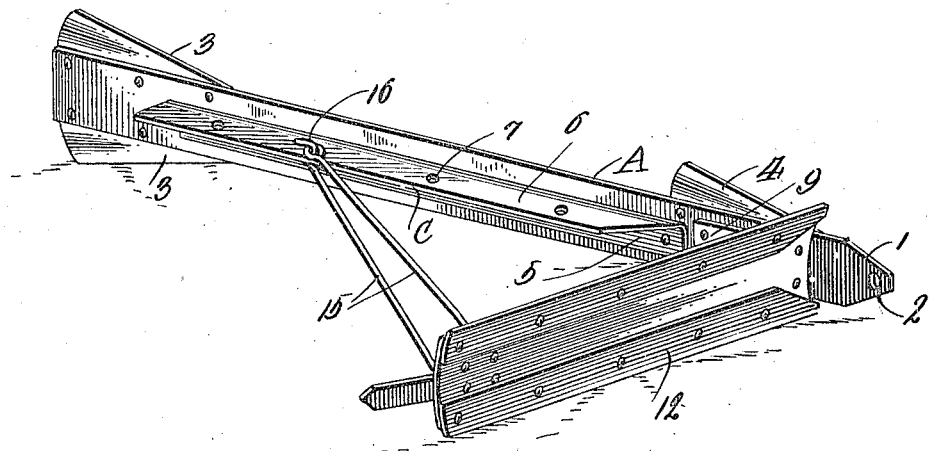
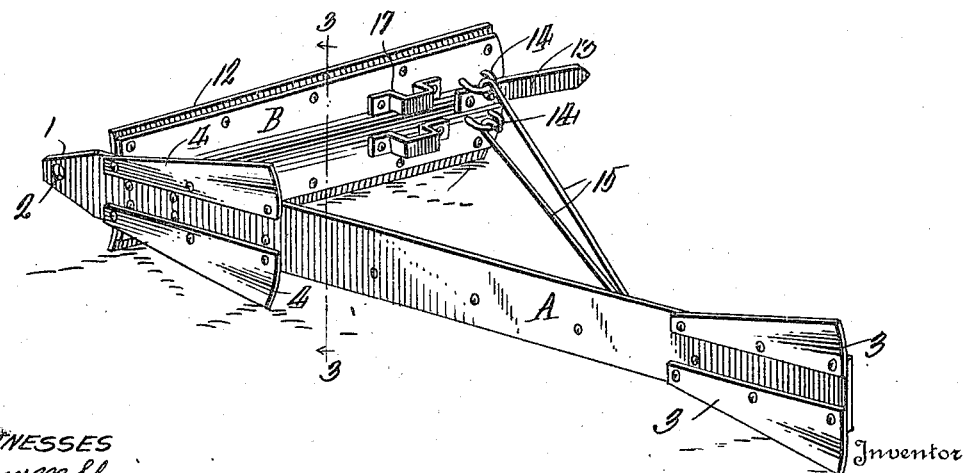
Inventor
R. A. MOORE
By Richard B. Owen, Attorney
WITNESSES Sept. 23, 1924.

R. A. MOORE

DRAG IMPLEMENT

Filed Jan. 26, 1924     2 Sheets-Sheet 2

1,509,213

Patented Sept. 23, 1924.

1,509,213

UNITED STATES PATENT OFFICE.

ROBERT A. MOORE, OF BALMORHEA, TEXAS.

DRAG IMPLEMENT.

Application filed January 26, 1924. Serial No. 688,843.

*To all whom it may concern;*

Be it known that I, ROBERT A. MOORE, citizen of the United States, residing at Balmorhea, in the county of Reeves and State of Texas, have invented certain new and useful Improvements in Drag Implements, of which the following is a specification.

The present invention relates to drag implements such as are commonly used upon roads, terraces and the like and has for its principal object to provide a simple and efficient device of this nature which will aid in properly crowning a road, surfacing a terrace or the like for irrigating purposes.

Another important object of the invention is to provide a device of this nature having an adjustable wing which may be disposed at various angles in relation to the body.

A still further object of the invention is to provide a device of this nature having a simple structure which is reliable, comparatively inexpensive to manufacture, durable, and well adapted to the purpose for which it is designed.

With the above and numerous other objects in view as will appear as the description progresses, the invention resides in certain novel features of construction, and in the combination and arrangement of parts as will be hereinafter more fully described and claimed.

In the drawings:

Figure 1 is a perspective view of the implement embodying my invention,

Figure 2 is a perspective view thereof taken from the opposite side shown in Figure 1.

Figure 3:
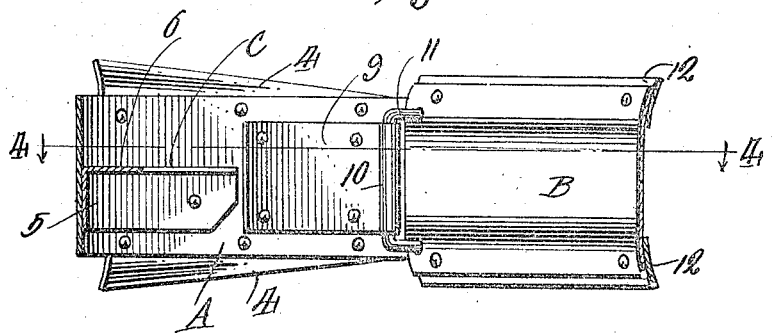
Figure 3 is a section taken transversely through the implement substantially on the line 3—3 of Figure 2, looking in the direction of the arrow.
Figure 4:
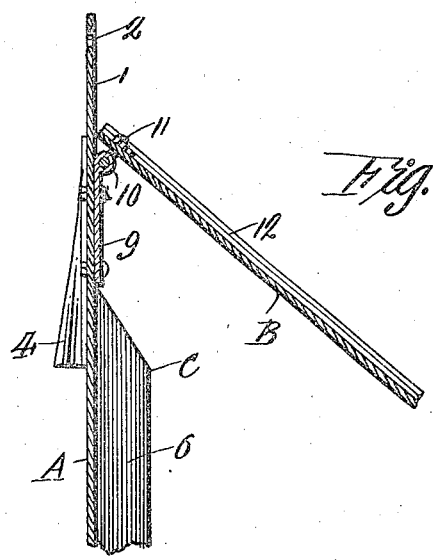
Figure 4 is a detail horizontal section taken substantially on the line 4—4 of Figure 3 looking in the direction of the arrow.

Referring to the drawing in detail it will be seen that the device consists generally of a body A and an adjustable wing B hinged thereto.

The body A is in the form of an elongated bar having its forward end 1 tapered and provided with an opening 2 for receiving a clevis or the like in order that the implement may be dragged along by draft horses or a tractor. Two pairs of fins are disposed on the body A one pair adjacent the rear end and indicated by the numerals 3 and the other pair adjacent the forward end immediately behind the tapered portion 1 and indicated by the numerals 4. The pairs of fins 3 and 4 are disposed so as to extend beyond the longitudinal edges of the body A and each fin is substantially triangular shape in formation and curved transversely so as to be dished. These fins are disposed on the outer face of the body 1 and are curved away from this outer face. The inner face of the body 1 has mounted thereon an angle plate C including a vertically disposed portion 5 suitably riveted or otherwise engaged to the body 1 and extending longitudinally therewith and the horizontal portion 6 provided with a plurality of apertures 7 for a purpose which will be hereinafter set forth.

The wing B is hinged at one end to the forward end of the body A. This is accomplished by providing on the inner face of the body A a member 9 terminating in a sleeve 10 for receiving a U-shaped bolt 11 the terminals of which pierce the wing B and are secured by means of nuts or in any other suitable manner. The wing B is curved transversely or dished as is indicated to advantage in Figure 3 and a pair of blades 12 is associated therewith one extending beyond each longitudinal edge. These blades 12 are dished transversely and are curved in substantially the same direction as is the wing B thereby forming offset continuations thereof. These blades are disposed on the outer face which is convexed, of the wing. The free end of the wing is provided with a handle 13 extending rearwardly therefrom. A pair of staples 14 is fixed to the inner face of the wing which is convexed for the purpose of receiving rods 15. The ends of these rods 15 are in the form of eyes and are adapted to be attached to the horizontal portion of the plate C by means of a bolt 16 or in any other suitable manner. The bolt 16 passes through the apertures 7 and its ends may be bent as is indicated in Figure 1 so as to prevent its accidental removal. A pair of U-shaped members 17 one disposed above the other is mounted on the inner face of the wing B for the purpose of receiving a bar whereby the implement may be readily tilted as may be desired during its movement along the ground. If the device is to be used for dragging in the same direction the relative positions of the body and wing may be readily reversed by drafting the handle 13 and lifting upwardly thereon so as to swing the wing on the other side of the body, simultaneously inverting the body. This body will be disposed in the gutter or the like and the wing would scrape over the body of the road for instance. If the device was used on a crown road the body would be disposed in the gutter and the wing on the sloping portions of the road. The fins 4 and 3 which are in engagement with the ground prevent sideward movement of the implement. The angular relation of the wing with the body may be readily changed by attaching the rods 15 with any of the apertures 8 by means of the bolt or the like 16.

It is thought that the construction and operation of the invention will clearly be understood without any more detail description thereof. It is desirous, however, to point out that numerous changes in the details of construction and in the combination and arrangement of parts may be resorted to without departing from the spirit or scope of the invention as hereinafter claimed.

Having thus described my invention what I claim as new is:

In an implement of the class described, an elongated body having its forward end tapered and provided with an aperture for receiving a clevis or the like, a plurality of fins arranged on the body so as to extend beyond its longitudinal edges, said fins being arranged in pairs, one pair being disposed adjacent the tapered end thereof and the other adjacent the other end thereof, a plate of angular construction in cross section having one portion fixed to the body and the other portion extending angularly therefrom and provided with a plurality of apertures, a wing, means for hinging the wing immediately behind the tapered end of the body, a pair of blades disposed on the wing one extending beyond each longitudinal edge thereof, said wing and said blades being curved transversely, a rod pivotally engaged with the wing adjacent its free end, means engaged with the rod for piercing the apertures of the plate whereby said wing may be held in various angular positions in relation to the body, and a handle projecting beyond the free end of the wing whereby said wing may be lifted upwardly for the purpose of inverting the implement all in the manner and for the purpose specified.

In testimony whereof I affix my signature in presence of two witnesses.

ROBERT A. MOORE.

Witnesses:
JOHN B. COFFEY,
E. L. GEORGE.